United States Patent
Salian et al.

(10) Patent No.: US 11,197,071 B2
(45) Date of Patent: Dec. 7, 2021

(54) METHODS AND SYSTEMS FOR AUTOMATED MEDIA DEVICE COMMUNICATIONS CONFIGURATION

(71) Applicant: SLING MEDIA PVT LTD, Bangaluru (IN)

(72) Inventors: Yatindra Salian, Bangalore (IN); Girish Reddivari, Bangalore (IN)

(73) Assignee: SLING MEDIA PVT LTD, Bangaluru (IN)

( * ) Notice: Subject to any disclaimer, the term of this patent is extended or adjusted under 35 U.S.C. 154(b) by 42 days.

(21) Appl. No.: 16/662,853

(22) Filed: Oct. 24, 2019

(65) Prior Publication Data
US 2021/0127175 A1   Apr. 29, 2021

(51) Int. Cl.
*H04N 21/63* (2011.01)
*H04L 29/06* (2006.01)
*H04N 21/2665* (2011.01)
*H04N 21/426* (2011.01)
*H04N 21/4363* (2011.01)

(52) U.S. Cl.
CPC ......... *H04N 21/632* (2013.01); *H04L 65/608* (2013.01); *H04N 21/2665* (2013.01); *H04N 21/42684* (2013.01); *H04N 21/43637* (2013.01)

(58) Field of Classification Search
CPC ..... H04W 76/10; H04W 12/06; H04W 12/50; H04W 12/77; H04W 84/12; H04W 12/08; H04W 8/005; H04W 12/04; H04W 48/14; H04W 48/16; H04W 4/80; H04W 60/00; H04W 12/65; H04W 48/08; H04W 4/08; H04W 76/11; H04W 76/14; H04W 84/18; H04W 88/04; H04W 88/08; H04L 41/0806; H04L 41/0869; H04L 41/0886; H04L 2012/2841; H04L 2012/285; H04L 41/0809; H04L 63/064; H04L 63/08; H04L 63/083; H04L 63/168; H04L 63/18; H04L 67/1042; H04L 67/1044; H04L 9/3247
See application file for complete search history.

(56) References Cited

U.S. PATENT DOCUMENTS

| | | | |
|---|---|---|---|
| 8,967,460 B1 * | 3/2015 | Baykal | G06Q 10/20 235/375 |
| 9,838,252 B2 * | 12/2017 | Lin | H04L 41/0869 |
| 10,601,811 B2 * | 3/2020 | Zhong | H04W 12/08 |
| 2006/0208088 A1 | 9/2006 | Sekiguchi | |
| 2007/0089110 A1 * | 4/2007 | Li | H04L 67/2847 717/178 |

(Continued)

*Primary Examiner* — David R Lazaro
(74) *Attorney, Agent, or Firm* — Lorenz & Kopf, LLP

(57) ABSTRACT

Methods and systems are provided for automatically establishing communications with a media device. One method involves a client device capturing and analyzing an image of a media device to obtain identification information associated with the media device, automatically configuring a network interface of the client device to communicate on a wireless network using at least a portion of the identification information associated with the media device obtained from the captured image, and thereafter establishing a peer-to-peer communication session with the media device via the wireless network. In one or more embodiments, a name or other identifier associated with the wireless network includes the portion of the identification information.

20 Claims, 4 Drawing Sheets

(56) References Cited

U.S. PATENT DOCUMENTS

| | | | |
|---|---|---|---|
| 2011/0197229 A1* | 8/2011 | Yassa | H04N 21/4344 |
| | | | 725/39 |
| 2012/0162537 A1* | 6/2012 | Maddali | H04N 21/42204 |
| | | | 348/734 |
| 2012/0185905 A1* | 7/2012 | Kelley | H04N 21/23614 |
| | | | 725/109 |
| 2013/0115881 A1 | 5/2013 | Liao et al. | |
| 2013/0124740 A1* | 5/2013 | Liansky | H04M 1/72412 |
| | | | 709/228 |
| 2013/0223279 A1* | 8/2013 | Tinnakornsrisuphap | |
| | | | H04W 4/80 |
| | | | 370/254 |
| 2013/0276075 A1* | 10/2013 | Gong | H04W 76/10 |
| | | | 726/5 |
| 2013/0297839 A1* | 11/2013 | Chai | G06F 13/385 |
| | | | 710/62 |
| 2014/0045472 A1 | 2/2014 | Sharma et al. | |
| 2014/0369232 A1* | 12/2014 | Kim | H04W 8/005 |
| | | | 370/254 |
| 2015/0100991 A1* | 4/2015 | Risberg | H04L 67/104 |
| | | | 725/80 |
| 2015/0172061 A1* | 6/2015 | Lee | H04L 9/3247 |
| | | | 713/176 |
| 2015/0172118 A1* | 6/2015 | Lin | H04L 41/0806 |
| | | | 370/401 |
| 2015/0286450 A1* | 10/2015 | Yang | G06F 3/1292 |
| | | | 358/1.15 |
| 2016/0037564 A1* | 2/2016 | Borden | H04W 48/16 |
| | | | 370/254 |
| 2016/0142763 A1 | 5/2016 | Kim et al. | |
| 2016/0192406 A1 | 6/2016 | De Schepper et al. | |
| 2016/0285920 A1* | 9/2016 | Kuo | H04L 67/303 |
| 2016/0360561 A1* | 12/2016 | Lee | H04N 5/23206 |
| 2017/0102903 A1* | 4/2017 | Nagasawa | G06F 3/1222 |
| 2018/0069718 A1 | 3/2018 | Terao | |
| 2018/0249515 A1* | 8/2018 | Li | H04W 76/10 |
| 2019/0074970 A1* | 3/2019 | Clancy | G09C 5/00 |
| 2019/0147309 A1* | 5/2019 | Hirano | G06F 3/0304 |
| | | | 726/5 |
| 2019/0222893 A1* | 7/2019 | Topiwalla | H04N 21/4753 |
| 2019/0303065 A1 | 10/2019 | Shibata | |
| 2021/0014681 A1* | 1/2021 | Pang | H04W 12/77 |

* cited by examiner

METHODS AND SYSTEMS FOR AUTOMATED MEDIA DEVICE COMMUNICATIONS CONFIGURATION

TECHNICAL FIELD

Embodiments of the subject matter described herein relate generally to media presentation devices, and more particularly, to automatically configuring devices involved in media presentation for compatible operations with one another.

BACKGROUND

Media content can now be received from any number of different sources. For example, a home entertainment system may include a set-top box (STB) or other receiver to receive broadcast television content, such as, for example, a direct broadcast satellite (DBS), cable and/or terrestrial broadcast signal. In addition to broadcast media, home entertainment systems often include a STB or other media player devices that support over-the-top (OTT) media services, on-demand media services, and the like. Additionally, media content can also be "placeshifted" to allow viewing on different devices other than the viewer's primary television set.

Due to the proliferation of portable consumer electronic devices with display and network communication capabilities, viewers often have the opportunity to interact with other media devices in a home entertainment system over a communications network. However, manually configuring individual components of a home entertainment system for compatible operations with the other components can be time consuming or complex enough that technologically unsophisticated users may become frustrated or discouraged from setting up and taking advantage of the full capabilities of a home entertainment system. Accordingly, it is desirable to reduce the time and manual burdens associated with configuring devices for interoperability within a home entertainment system. Other desirable features and characteristics will become apparent from the subsequent detailed description and the appended claims, taken in conjunction with the accompanying drawings and the foregoing technical field and background.

BRIEF SUMMARY

Embodiments of methods, systems, and devices for establishing communications with a media device. One exemplary method involves analyzing, by a processing system of a client device, an image including at least a portion of the media device to obtain identification information associated with the media device, automatically configuring, by the processing system, a network interface of the client device to communicate on a wireless network using at least a portion of the identification information associated with the media device, and thereafter establishing, by the processing system via the network interface, a peer-to-peer communication session with the media device via the wireless network.

In another embodiment, an apparatus for a media device is provided. The media device includes a housing having identification information provided thereon, a network interface to provide an ad-hoc wireless network having a name including a least a portion of the identification information, and a control module coupled to the network interface to establish a peer-to-peer communication session with a client device via the ad-hoc wireless network in response to a communication received from the client device, receive network configuration information for a different wireless network from the client device via the peer-to-peer communication session, and automatically configure the network interface to communicate on the different wireless network in response to receiving the network configuration information. In one embodiment, the identification information comprises a media access control (MAC) address associated with the network interface, the ad-hoc wireless network has a first service set identifier (SSID) including at least a portion of the MAC address, the network configuration information includes a second SSID different from the first SSID, and the control module automatically configures the network interface to communicate on the different wireless network by switching the network interface of the media device from the first SSID to the second SSID.

In yet another embodiment, an apparatus for a client device is provided. The client device includes an imaging arrangement to capture an image of a media device, a network interface, and a processing system coupled to the imaging arrangement and the network interface to analyze the image to obtain identification information associated with the media device, determine a service set identifier (SSID) associated with an ad-hoc wireless network associated with the media device using at least a portion of the identification information, automatically switch the network interface to the determined SSID to communicate on the ad-hoc wireless network associated with the media device, and establish a peer-to-peer communications session with the media device via the ad-hoc wireless network, wherein the SSID associated with the ad-hoc wireless network includes the portion of the identification information.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
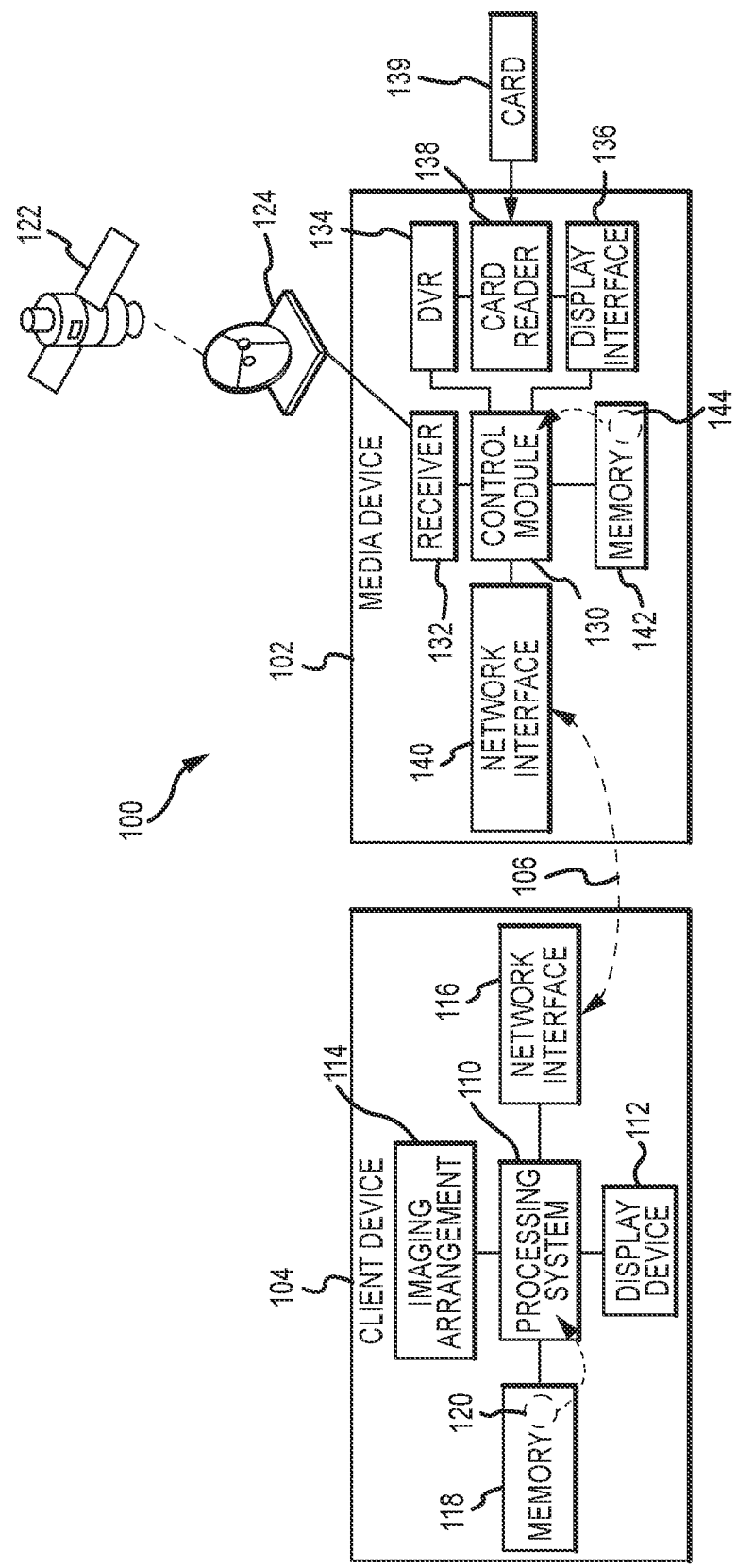
FIG. 1 depicts a block diagram of an exemplary embodiment of a media system.

The following detailed description of the invention is merely exemplary in nature and is not intended to limit the invention or the application and uses of the invention. Furthermore, there is no intention to be bound by any theory presented in the preceding background, brief summary, or the following detailed description.

Embodiments of the subject matter described herein generally relate to establishing communications with a media device to enable interactions with the media device, for example, to stream, view, or otherwise manage media content available at the media device. As used herein, "media content," "media program," "multimedia content," or variants thereof should be understood as referring to any audio-visual programming or content in any streaming, file-based or other format. The media content generally includes data that, when processed by a media player or decoder, allows the media player or decoder to present a visual and/or audio representation of the corresponding program content to a viewer (i.e., user of a device including the media player or decoder). In one or more embodiments, a media player can be realized as a piece of software that plays multimedia content (e.g., displays video and plays audio).

As described in greater detail below, in exemplary embodiments, to establish communications with a media device, a user utilizes another electronic device (alternatively referred to herein as a client device) to capture or otherwise obtain one or more images of at least a portion of the media device that includes identification information associated with the media device, such as, for example, a media access control (MAC) address assigned to a network interface of the media device. The image data is then analyzed at the client device to recognize or otherwise identify the identification information, which, in turn, is then utilized to automatically configure the client device for communications with the media device. In this regard, in exemplary embodiments, the media device is configured to automatically transmit or otherwise broadcast one or more packets, beacons, or the like that indicate an available communications network that is associated with and supported by the media device, with the communications network having a service set identifier (SSID) or other name or identifier associated therewith that includes at least a portion of the identification information associated with the media device. For example, in one or more embodiments, the media device supports a communications network having an SSID that includes the last four digits of the MAC address assigned to its network interface.

After recognizing the identification information from the image data, the client device automatically configures itself for communications with the media device via the communications network, for example, by commanding, signaling, or otherwise instructing a network interface of the client device to operate on the communications network associated with the media device. In this regard, an application executing at the client device may be configured to automatically determine the SSID for the network associated media device using at least a portion of the MAC address and then switch or otherwise configure the network interface to monitor for a beacon or other communication broadcast by the media device on that determined SSID. In response to identifying a broadcast communication from the media device, the network interface may automatically configure itself for communications on the network using information contained within the broadcast communication and then automatically transmit or otherwise provide one or more requests to the media device via the network associated with the media device to establish a peer-to-peer and point-to-point communication session with the media device. Once the communications session with the media device is established, the application at the client device may transmit and/or receive communications to/from the media device. For example, the application at the client device may transmit or otherwise provide requests to the media device, for example, to obtain a listing of media programs available at the media device, to manage media programs available at the media device (e.g., deleting or scheduling recordings, etc.), to stream a media program from the media device via the communications session established over the ad-hoc wireless network, and/or the like.

In an exemplary embodiment, the peer-to-peer communication session is utilized to transmit or otherwise provide network configuration information to the media device, which, in turn, enables the media device to communicate on a different communications network. For example, the application at the client device may transmit or otherwise provide the SSID, network name, and/or other parameters associated with a wireless local area network (WLAN) (e.g., passwords or other authentication information), which, in turn, is utilized by an application or other process at the media device to automatically configure the media device for communications on the other network. In this regard, an application at the media device may command, instruct, signal or otherwise configure the media device network interface to cease transmissions on the SSID associated with the media device and switch the media device network interface from the media device SSID to the WLAN SSID provided by the client device. The application at the media device may then utilize the authentication information or other parameters provided by the client device to establish communications on the WLAN. Thereafter, the client device or potentially other devices on the WLAN may be able to communicate or otherwise interact with the media device, for example, to stream, view, or otherwise manage media content available at the media device.

By processing an image to automatically recognize identification information for the media device and then using that identification information to automatically determine the SSID, network name, and/or other parameters for establishing communications with the media device and thereafter automatically establish such communications, the user of the client device is alleviated of the burden of manually configuring the client device and/or the media device for interoperable communications. Additionally, as described in greater detail below, usernames, passwords, or other authentication information or other security protections may be coded or otherwise integrated into the application at the client device, thereby further alleviating the manual burden of connecting to the media device. Furthermore, in some embodiments, where the logic for deriving or determining the SSID or other network parameters from the information recognized from the captured image data is coded or otherwise integrated into the application at the client device, the media device may hide or otherwise exclude such network information from broadcast communications to reduce the likelihood of potentially interfering communications.

FIG. 1 depicts a media system 100 configured to support automatically establishing communications with a media device 102 using another electronic device 104 capable of capturing one or more images of the media device 102. In this regard, the electronic device 104 may be realized as any sort of electronic device capable of capturing images, such as a mobile telephone, a tablet computer, a laptop or notebook computer, a desktop computer, and/or any other electronic device capable of capturing images and communicating via a network. For purposes of explanation, but without limitation, the electronic device 104 may alternatively be referred to herein as a client device.

Although not illustrated in FIG. 1, in practice, the client device 104 may communicate with any number different electronic devices (alternatively referred to herein as media presentation devices) that may be involved with one or more aspects of presenting media content over a wireless communications network, such as a WLAN, a wireless personal area network (PAN), a fixed wireless network, a wide area network, a NarrowBand Internet of Things (NB-IoT) network, or the like. In this regard, the media presentation device(s) 104 may be realized as any sort of electronic device capable of receiving and/or presenting media content from another device or network, such as, for example, a television, monitor, liquid crystal display (LCD), light emitting diode (LED) display, plasma display, or other device capable of reproducing video or audiovisual media content received from a network, a set-top box, a receiver, an over-the-top (OTT) streaming device, a streaming stick, a gaming console, and/or the like. The media presentation devices could also include one or more routers, modems, firewall devices, personal computers, tablets or other network-enabled electronic devices, and could include one or more speakers, sound bars, or other devices capable of reproducing the audio portion of media content received from another device or network.

As described in greater detail below in the context of FIGS. 2-5, in one or more exemplary embodiments, the client device 104 establishes a peer-to-peer communication session 106 with the media device 102, which, in turn, may be utilized by the client device 104 to provision the media device 102 with network configuration information for enabling communications on another wireless network. In this regard, the client device 104 may transmit or otherwise provide, to the media device 102 via the peer-to-peer communication session 106, the SSID or network name, password or other authentication information, and/or other parameters or network configuration information associated with a WLAN having other media presentation devices communicating thereon. The media device 102 may then utilize the network configuration information provided by the client device 104 to switch or otherwise configure its network interface 140 to communicate on the WLAN with the SSID provided by the client device 104, thereby enabling the media device 102 to communicate with other media presentation devices and/or the client device 104 via the WLAN. Thereafter, the client device 104 and/or other media presentation devices may be utilized to stream, view, or otherwise manage media content available at the media device 102 over the WLAN.

In exemplary embodiments, the client device 104 includes or otherwise executes a media device management application (or service) 120 configured to support establishing the peer-to-peer communication session 106 with the media device 102 and communicating with the media device 102 via the peer-to-peer communication session 106. The media device management application 120 is configured to automatically establish the peer-to-peer communication session 106 with the media device 102 in response to a captured image that includes identification information associated with the media device 102 without any additional manual networking configuration tasks. Thereafter, the media device management application 120 supports communications with the media device 102, for example, to transmit WLAN configuration information to the media device 102, obtain a listing of media programs available at the media device 102 (e.g., recorded media programs, current and/or scheduled broadcast media programs, and/or the like), stream media content from the media device 102, and/or the like.

As illustrated in FIG. 1, the client device 104 includes a processing system 110 that is coupled to a display device 112, an imaging arrangement 114, and a network interface 116, wherein the processing system 110 is configured to execute or otherwise support the media device management application 120 and additional processes, tasks, functions, and/or operations described in greater detail below. The processing system 110 may be realized using any suitable processing system and/or devices, such as, for example, one or more processors, central processing units (CPUs), graphics processing units (GPUs), controllers, microprocessors, microcontrollers, processing cores and/or other computing resources configured to support the subject matter described herein. In exemplary embodiments, the client device 104 includes a data storage element (or memory) 118 that is coupled to or otherwise accessed by the processing system 110. The memory 118 may be realized using as random access memory (RAM), read only memory (ROM), flash memory, magnetic or optical mass storage, or any other suitable configuration of non-transitory short or long term data storage or other non-transitory computer-readable media capable of storing programming instructions for execution by the processing system 110. The stored programming instructions, when read and executed by the processing system 110, cause processing system 110 to create, generate, or otherwise facilitate the media device management application 120 that supports the communications configuration process 200 of FIG. 2 and related tasks, operations, functions, and/or processes described in greater detail below.

The display device 112 generally represents the component, hardware or the like of the client device 104 that is capable of displaying, rendering, or otherwise presenting media content and/or other imagery that is received by or otherwise stored on the client device 104. In this regard, the display 112 may be realized as a monitor, screen, or another conventional electronic display device capable of graphically presenting media content and/or other imagery.

The network interface 116 generally represents the component, hardware or the like of the client device 104 that facilitates communications over a communications network that supports transmission of data and/or information via a peer-to-peer communication session 106 between devices 102, 104. For example, in one embodiment, the network interface 116 is realized as a wireless adapter, a wireless transceiver, a wireless network interface controller, or the like that is configured to support a WLAN in accordance with one or more of the IEEE 802.11 standards that supports the transmission control protocol and/or internet protocol (TCP/IP) or other conventional protocols. In another embodiment, the network interface 116 may be configured to support a wireless personal area network (PAN) or another suitable short range network, such as, for example, a Bluetooth ad-hoc network, in which case the network interface 116 is realized as a Bluetooth adapter (or transceiver). In yet other embodiments, the network interface 116 may be configured to support a cellular communications network, a wired local area network, the Internet, or the like, in which case the network interface 116 may be realized as a cellular transceiver, a wired network interface controller (e.g., an Ethernet adapter), or the like. In this regard, practical embodiments of the client device 104 could include any number of different network interfaces that support communications over different types of networks and/or using different protocols. That said, in exemplary embodiments described herein, the network interface 116 is realized as a wireless network adapter configured to support communications over a WLAN 108 in accordance with one or more of the IEEE 802.11 standards.

The imaging arrangement 114 imaging arrangement 114 generally represents the image sensor, camera, optics and/or other imaging elements or component(s) of the client device 104 that are capable of capturing imagery of the environment around the client device 104 within the field of view of the imaging arrangement 114. For example, the imaging arrangement 114 could include or otherwise be realized as an electronic image sensor or similar imaging element that captures incident light and translates or otherwise converts the captured light into a corresponding set of image data. For purposes of explanation, but without limitation, the imaging arrangement 114 imaging arrangement 114 may alternatively be referred to herein as a camera. In exemplary embodiments, the user of the client device 104 manipulates or otherwise orients the client device 104 so that the camera 114 captures at least a portion of a housing of the media device 102 having identification information associated with the media device 102 provided thereon, which, in turn, it utilized by the media device management application 120 to automatically identify or otherwise determine the ad-hoc wireless network associated with the media device 102 and establish the peer-to-peer communication session 106, as described in greater detail below.

Still referring to FIG. 1, in exemplary embodiments, the media device 102 is realized as a set-top box (STB) or similar system that is able to receive television programming and/or to record certain media programs. Exemplary embodiments of media device 102 will therefore include a receiver interface 132 for receiving satellite, cable and/or broadcast programming signals from broadcast content sources 122, as well as a data storage medium 134 (e.g., a hard disk, flash memory, or another suitable non-volatile data storage element) to support a digital video recorder (DVR) feature and/or functionality, a display interface 136 for providing imagery and/or video corresponding to a media program to a display device, and a control module 130 that directs, manages, or otherwise controls the operations of the media device 102 as appropriate. For convenience, but without limitation, the data storage medium 134 is alternatively referred to herein as a DVR. In some embodiments, the media device 102 may also include an access card interface or card reader 138 adapted to receive an access card 139 (or viewing card) configured to ensure that the viewer is authorized to view media content that may be available at the media device 102. In this regard, the access card 139 may include unique identification information associated with a particular subscriber to the broadcast content source 122 or otherwise include information that facilitates receiving and/or decoding media content provided by the broadcast content source 122. It should be appreciated that the subject matter described herein is not limited to STBs, and may be implemented in an equivalent manner in the context of any component, hardware or the like capable of receiving and processing media content and providing media content to a display device or other networked electronic device for presentation.

In the illustrated embodiment, media device 102 is capable of receiving digital broadcast satellite (DBS) signals transmitted from a broadcast content source 122, such as a satellite, using an antenna 124 that provides received signals to the receiver 132. Equivalent embodiments, however, could receive programming at receiver 132 from any sort of cable connection, broadcast source, removable media, network service, external device and/or the like. The DVR 134 feature stores recorded programming (e.g., broadcast programming received via receiver 132) on a hard disk drive, memory, or other storage medium as appropriate in response to user/viewer programming instructions, wherein the recorded programming may be subsequently viewed on a display device coupled to the display interface 136 or another device communicatively coupled to the media device 102 via a network (e.g., client device 104 or another media presentation device). Content stored in DVR 134 may be any sort of file-based programming or other content that is accessible to media device 102. Additionally, media content in DVR 134 may be stored in any sort of compressed or uncompressed format, as desired, and may be encoded or transcoded as desired for effective receipt, storage, retrieval and playing.

The control module 130 may be realized as any suitable combination of hardware, firmware, and/or other components of the media device 102 capable of directing, managing or otherwise controlling the operations of media device 102 and supporting the communications configuration process 200 described in greater detail below in the context of FIG. 2. The control module 130 may include one or more processing systems and/or devices, such as, for example, one or more processors, central processing units (CPUs), graphics processing units (GPUs), controllers, microprocessors, microcontrollers, processing cores and/or other computing resources. The media device 102 includes a data storage element (or memory) 142 that is coupled to or otherwise accessed by the control module 130 and stores programming instructions that, when read and executed, cause the control module 130 to perform various tasks, functions, processes and/or operations to control operations of the media device 102 and support the communications configuration process 200 described in greater detail below. In this regard, in exemplary embodiments, the stored programming instructions, when read and executed, cause control module 130 to create, generate, or otherwise facilitate the communications configuration application 144 that interacts with the media device management application 120 or otherwise supports the communications configuration process 200 of FIG. 2 and related tasks, operations, functions, and/or processes described in greater detail below. In some embodiments, the control module 130 is implemented as a "system on a chip" (SoC) that incorporates a hybrid microcontroller with memory, input/output and other features to perform the various signal processing and other actions of media device 102, and in which case a separate memory 142 may not be provided.

The network interface 140 generally represents the component, hardware or the like of the media device 102 that facilitates communications with the client device 104. Accordingly, depending on the embodiment, the network interface 140 may be realized as a wireless adapter, a wireless transceiver, a wireless network interface controller, a Bluetooth adapter (or transceiver), a cellular transceiver, a wired network interface controller (e.g., an Ethernet adapter), or the like as appropriate. That said, in exemplary embodiments described herein, the network interface 140 is realized as a wireless network adapter that facilitates wireless communications via a local network. Similar to the client device 104, it should be appreciated that practical embodiments of the media device 102 could include any number of different network interfaces that support communications over different types of networks and/or using different protocols.

It should be appreciated that FIG. 1 depicts merely one exemplary embodiment of a media device 102, and in practice, the media device 102 may be physically and/or logically implemented in any manner to suit the needs of a particular embodiment. In this regard, in some embodiments, the components in media device 102 may be provided within a common chassis or housing as illustrated in FIG. 1, although equivalent embodiments may implement media device 102 with any number of inter-connected but discrete components or systems. For example, in some embodiments, the media device 102 may be realized as a combination of a STB and a placeshifting device, wherein some features of the media device 102 (e.g., the DVR 134, the receiver 132, the display interface 136) are implemented by the STB and other features of the media device 102 (e.g., the network interface 140) are implemented by the placeshifting device, wherein the placeshifting device works in conjunction with the STB to shift the viewing experience to another electronic device via a communications network. Examples of placeshifting devices that may be used in some embodiments of media device 102 could include any of the various SLINGBOX products available from Sling Media of Foster City, Calif., although other products or services could be used in other embodiments. Many different types of placeshifting devices are generally capable of receiving media content from an external source, such as any sort of DVR or STB, cable or satellite programming source, DVD player, content servers, and/or the like. In other embodiments, placeshifting features are incorporated within the same device that provides content-receiving or other capabilities. Media device 102 may be a hybrid DVR and/or receiver, for example, that also provides transcoding and placeshifting features. Some examples of conventional placeshifting functions, features, systems and structures are described in United States Patent Publication No. 2006/0095471, although the features described herein could be equivalently applied with any number of other techniques and structures in addition to those described in that particular publication.

Figure 2:
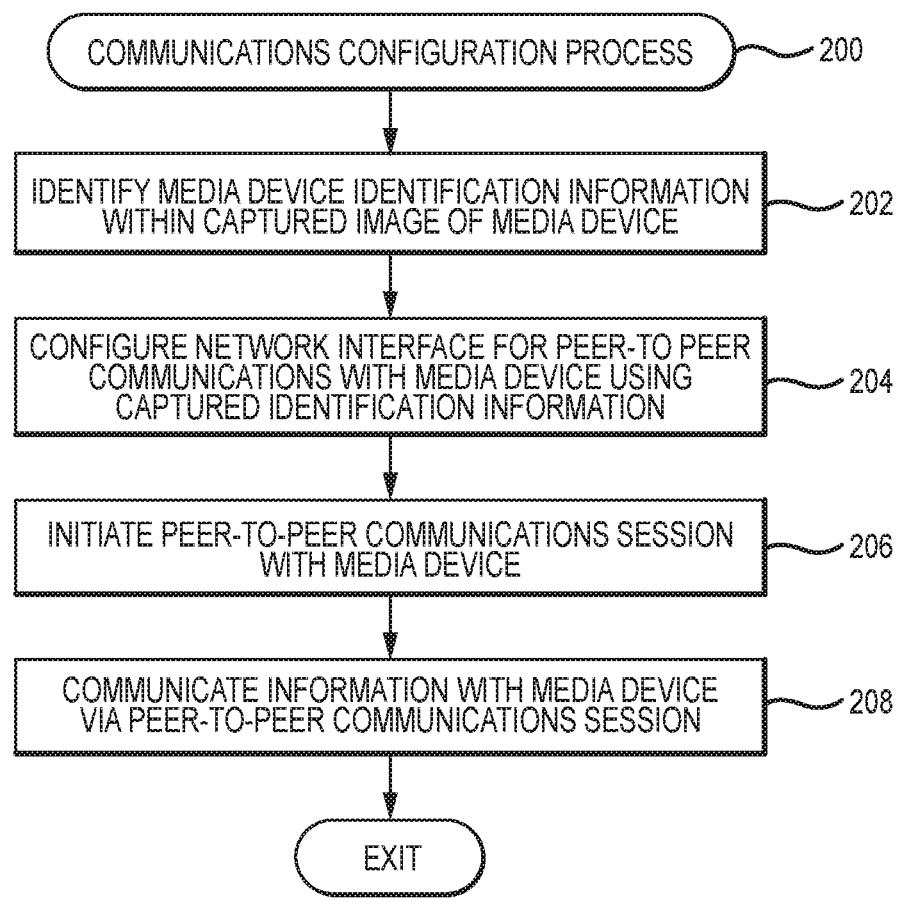
FIG. 2 is a flowchart of an exemplary communications configuration process suitable for use with the media system of FIG. 1 in accordance with one or more embodiments.

FIG. 2 depicts an exemplary embodiment of a communications configuration process 200 suitable for implementation in a media system, such as the media system 100 of FIG. 1, to automatically establish communications with a media device based on a captured image of the media device. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the communications configuration process 200 may be performed by different elements of a media system 100. It should be appreciated that the communications configuration process 200 may include any number of additional or alternative tasks, the tasks need not be performed in the illustrated order and/or the tasks may be performed concurrently, and/or the communications configuration process 200 may be incorporated into a more comprehensive procedure or process having additional functionality not described in detail herein. Moreover, one or more of the tasks shown and described in the context of FIG. 2 could be omitted from a practical embodiment of the communications configuration process 200 as long as the intended overall functionality remains intact.

Referring to FIG. 2 with continued reference to FIG. 1, the illustrated communications configuration process 200 initializes or otherwise begins by parsing or otherwise analyzing captured imagery to detect or otherwise identify identification information associated with the media device within the image data (task 202). For example, a user of the client device 104 may open, initiate or otherwise interact with the media device management application 120 on the client device 104 when the user desires to setup, configure or otherwise interact with a media device 102. The media device management application 120 may generate or otherwise provide a prompt that indicates, to the user, that he or she should obtain an image of the MAC address or some other identification information that may be printed or otherwise provided on an exterior surface of a housing of the media device 102. In some embodiments, the media device management application 120 continually monitors or otherwise analyzes the image data provided by the camera 114 corresponding to the field of view of the camera 114 in real-time to detect or otherwise identify the presence of the MAC address or other identification information associated with the media device 102 within the image data. In other embodiments, the media device management application 120 may generate or otherwise provide a graphical user interface (GUI) display that includes an image region corresponding to the current field of view of the camera 114 and a button or similar GUI element that is selectable by the user to capture an image once the MAC address or other identification information associated with the media device 102 is depicted within the image region of the GUI display. The captured image file may then be analyzed by the media device management application 120 to identify the media device identification information from within the captured image.

Figure 3:
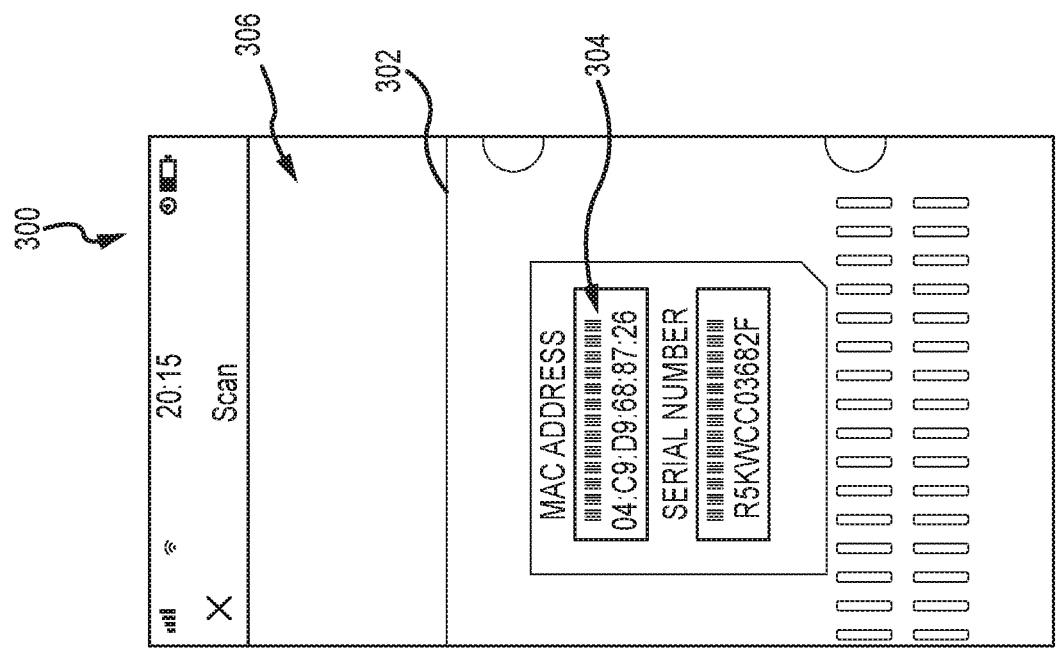

FIG. 3 depicts an exemplary GUI display 300 that may be presented on the client device 104 by the media device management application 120. In this regard, FIG. 3 depicts a scenario where the user has oriented the client device 104 so that the identification information 304 provided on the housing of a media device 302 is within the field of view of the camera 114 and depicted within the image region 306 of the GUI display 300. The media device management application 120 analyzes the captured image corresponding to the field of view of the camera 114 to recognize or otherwise identify the MAC address 304 provided on the housing of the media device 302. In some embodiments, the media device management application 120 may utilize optical character recognition techniques (e.g., pattern matching or the like) to recognize text contained within the captured image, and then apply one or more logic rules to isolate and identify the MAC address (or relevant portion thereof) from within the text contained in the captured image. In yet other embodiments, the media device management application 120 may incorporate, include, or otherwise support code reading functionality that supports identifying the MAC address based on a barcode, a quick response (QR) code, or some other representation of the MAC address in a machine-readable code format that is provided on the housing of the media device 302.

Referring again to FIG. 2, after identifying the media device identification information from the captured image, the communications configuration process 200 continues by automatically configuring the network interface of the client device for peer-to-peer communications with the media device using the media device identification information and then initiating the peer-to-peer communication session with the media device (tasks 204, 206). In this regard, in exemplary embodiments, the media device management application 120 identifies or otherwise determines network configuration information for connecting to an ad-hoc wireless network supported by the media device 102 using the media device identification information derived from the captured image. Thereafter, the media device management application 120 commands, signals, operates, or otherwise configures the network interface 116 in accordance with the network configuration information determined for the media device 102. After switching the network interface 116 to the network associated with the media device 102, the media device management application 120 initiates establishment of the peer-to-peer communication session 106.

In exemplary embodiments, the communications configuration application 144 on the media device 102 is configured so that by default, upon deployment or powering on of the media device 102, the network interface 140 is automatically operated to support an ad-hoc wireless network having a SSID or other network configuration information that includes or is otherwise based at least in part on at least a portion of the media device identification information. For example, the communications configuration application 144 may be configured to detect or otherwise identify the MAC address associated with the network interface 140, and then command, signal, or otherwise instruct the network interface 140 to periodically transmit or otherwise broadcast beacon frames to support an ad-hoc wireless network having an SSID that includes at least a portion of the MAC address. In one embodiment, the communications configuration application 144 switches or otherwise configures the network interface 140 for an SSID that includes the last four digits of the MAC address assigned to the media device 102. Additionally, other logic may be coded, programmed or otherwise integrated into the communications configuration application 144 to support generating other network configuration information based on the MAC address or other identification information associated with the media device 102. For example, the communications configuration application 144 may apply or otherwise assign a password to the ad-hoc wireless network that includes the first four digits of the MAC address. In this regard, there are numerous different manners in which network configuration information could be programmatically generated using device identification information, and the subject matter described herein is not intended to be limited to any particular type of network configuration information.

Similar to the communications configuration application 144, the same logic for generating or determining network configuration information from media device identification information may be coded, programmed or otherwise integrated into the media device management application 120. In this regard, in response to identifying media device identification information in the captured image, the media device management application 120 automatically generates or otherwise determines network configuration information for communicating with the media device 102 based at least in part on the media device identification information in accordance with the logic integrated into the media device management application 120. For example, the media device management application 120 may generate an SSID for the media device 102 that includes the last four digits of the MAC address identified from the captured image. Thereafter, the media device management application 120 may command or otherwise operate the network interface 116 to switch to the generated SSID associated with the media device 102.

After switching to the media device SSID, the media device management application 120 monitors the network interface 116 for receipt of a beacon frame broadcast by the media device 102. In response to receiving the beacon frame on the media device SSID network, the media device management application 120 automatically commands, signals, or otherwise operates the network interface 116 to transmit a response on the media device SSID network to establish the peer-to-peer communication session 106, for example, by transmitting an association request to establish an association with the media device SSID network and thereafter initiate a handshaking process (e.g., a 4-way handshake) to exchange keys and enable further communications with the media device 102.

Figure 4:
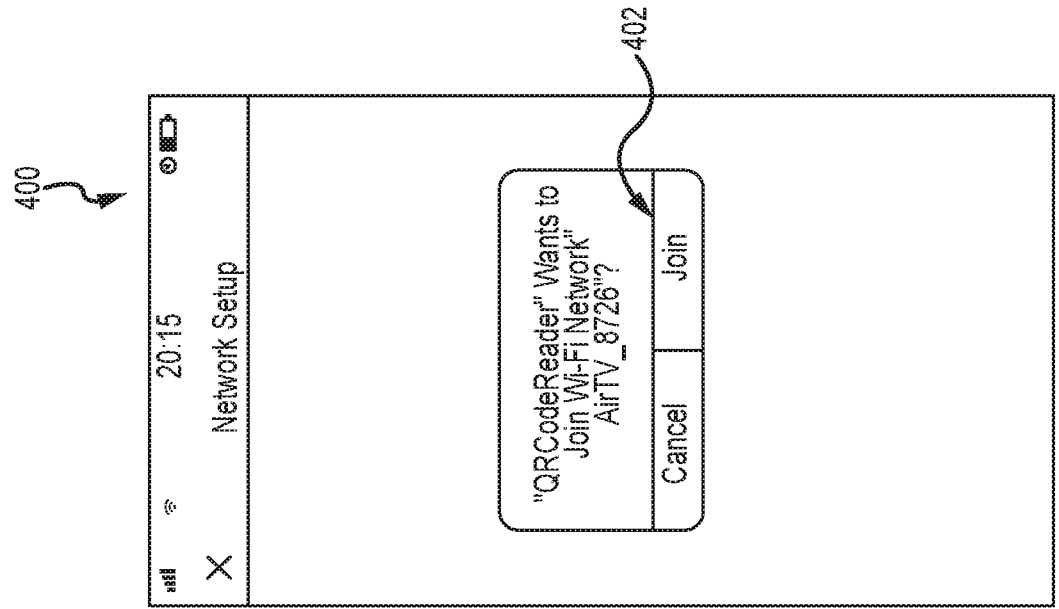
FIGS. 3-5 depict a sequence of graphical user interface (GUI) displays that may be presented on a client device in connection with one or more exemplary embodiments of the communications configuration process of FIG. 2.
Figure 5:
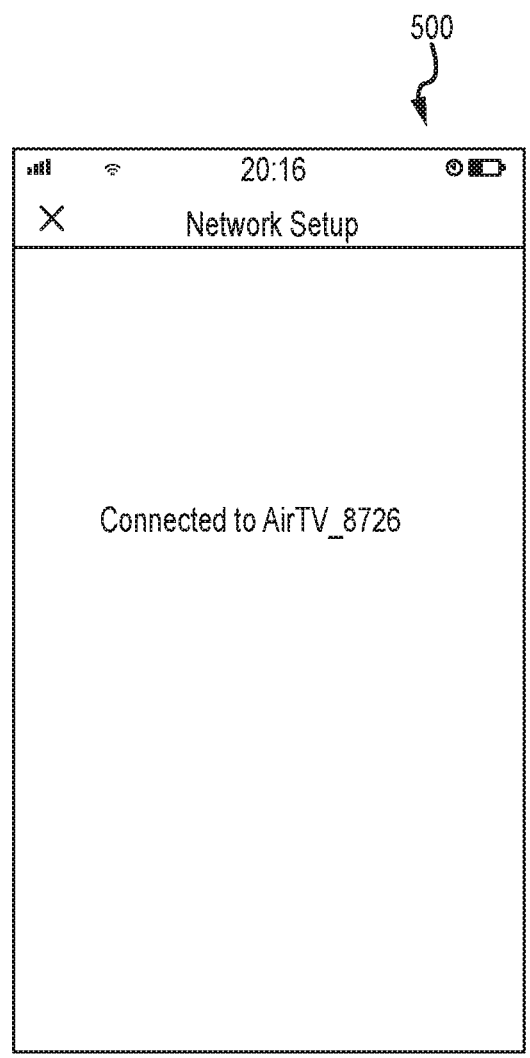

For example, referring to FIGS. 4-5 with continued reference to FIGS. 1-3, based on the captured image depicted in the imaging region 306, the media device management application 120 may determine the last four digits of the MAC address of the media device 102, 302 are 8726 after reading or otherwise decoding the encoded representation of the MAC address provided on the housing of the media device 102, 302. Additionally, the media device management application 120 may identify (e.g., based on the captured image, user input, or the like) the device model of the media device 102, 302, and then automatically generate the SSID for the media device 102, 302 by concatenating the device model and the last four digits of the MAC address (e.g., AirTV_8726).

In some embodiments, as illustrated in FIG. 4, the media device management application 120 may generate an updated GUI display 400 that graphically indicates the media device SSID network and includes a button or similar selectable GUI element 402 that allows the user to confirm or otherwise initiate communications over the media device SSID network. In response to selection of the GUI element 402, the media device management application 120 may automatically switch the network interface 116 to the AirTV_8726 communications network before transmitting or otherwise providing an association request to the media device 102, 302 on the AirTV_8726 communications network to establish the peer-to-peer communication session 106. That said, in other embodiments, the media device management application 120 may automatically initiate establishment of the peer-to-peer communication session 106 with the media device 102, 302 on the AirTV_8726 communications network without any user interaction, in which case the GUI display 400 would not be presented.

After a successful handshaking procedure with the media device 102, 302 on the AirTV_8726 communications network that establishes the peer-to-peer communication session 106 via the AirTV_8726 communications network, the media device management application 120 may generate an updated GUI display 500 that confirms that the media device management application 120 has established a peer-to-peer communication session 106 with the media device 102, 302 over the AirTV_8726 ad-hoc communications network associated with the media device 102, 302. As described above, in embodiments where a password or other security protections are applied to the AirTV_8726 communications network, the media device management application 120 may obtain the password or other authentication information from the memory 118 at the client device 104, or alternatively, the media device management application 120 may automatically generate the password or other authentication information based on the media device identification information or other information derived from the captured image. The media device management application 120 automatically transmits or otherwise provides the authentication information to the media device 102, 302 over the AirTV_8726 ad-hoc communications network, and in turn, the communications configuration application 144 may authenticate or otherwise enable the peer-to-peer communication session 106 with the client device 104 based on the authentication information provided by the media device management application 120.

Referring again to FIG. 2 with continued reference to FIG. 1, after establishing the peer-to-peer communication session with the media device via the ad-hoc network associated with the media device, the communications configuration process 200 continues by communicating information with the media device via the peer-to-peer communication session (task 208). In one or more exemplary embodiments, in response to establishing the peer-to-peer communication session 106, the media device management application 120 automatically transmits or otherwise provides network credentials and/or network configuration information for another communications network that is different from the ad-hoc network associated with the media device 102. For example, the media device management application 120 may automatically provide, to the communications configuration application 144 via the peer-to-peer communication session 106, the SSID, password, and/or other parameters or settings associated with a WLAN that the client device 104 has previously connected to. In response to receiving network configuration information for another communications network, the communications configuration application 144 may be configured to automatically implement the new network configuration information at the media device 102. In this regard, the communications configuration application 144 may automatically command, signal, instruct, or otherwise operate the network interface 140 to switch the network interface 140 from the media device SSID to the WLAN SSID provided by the media device management application 120, and then use the password and/or other network configuration information provided by the media device management application 120 to automatically establish communications capability on the WLAN. In this manner, communications between the media device 102 and other media presentation devices on the WLAN may be facilitated or otherwise enabled without any manual configuration of the media device 102.

In one or more embodiments, the peer-to-peer communication session 106 may be utilized by a user of the client device 104 to review, manage, or stream media content available at the media device 102. For example, after establishing the peer-to-peer communication session 106, a user may utilize the media device management application 120 to navigate to a GUI display for viewing a listing of recorded media programs stored on the DVR 134 at the media device 102 and/or broadcast media programs that are available from the broadcast content source 122. In response, the media device management application 120 may transmit or otherwise provide, to the media device 102 via the peer-to-peer communication session 106, a request to the media device 102 for information pertaining to the media programs available at the media device 102, and in response, the media device 102 may transmit or otherwise provide, to the client device 104 via the peer-to-peer communication session 106, indicia of the available media programs at the media device 102. The media device management application 120 may provide a GUI display that indicates media programs available at the media device 102 along with selectable GUI elements that enable the user to schedule recordings, delete recordings, or otherwise manage media content at the media device 102. Additionally, a GUI display provided by the media device management application 120 may include a GUI element selectable by the user to indicate a desire to stream a media program from the media device 102 to the client device 104, such as, for example, a live broadcast media program that is capable of being received by the media device 102 in real-time from the broadcast content source 122 or a previously-aired broadcast media program that is stored at the DVR 134 of the media device 102. In response to receiving indication of the media program to be streamed, the media device 102 automatically begins transferring the data corresponding to the selected media program to the client device 104 via the peer-to-peer communication session 106 for presentation by a media player or similar application at the client device 104. In this manner, the client device 104 and the media device 102 may be setup or otherwise for streaming media programs by merely requiring the user to capture an image of a portion of the STB that includes identification information assigned to the STB.

In yet other embodiments, the communications configuration application 144 may be configured to automatically detect or identify a television or other display device communicatively coupled to the WLAN and configure the media device 102 to transmit or otherwise provide media content to that device on the WLAN. In this regard, the communications configuration application 144 and the network interface 140 may cooperate to perform a discovery procedure or otherwise scan the WLAN for other devices. In response to discovering a device, the communications configuration application 144 may obtain identification information for the discovered device and store or otherwise maintain the identification information at the media device 102 (e.g., in memory 142), such as, for example, an address of a television or similar media presentation device on the WLAN (e.g., an internet protocol (IP) address or similar network address), a unique identifier associated with the network interface of the respective presentation device (e.g., a MAC address, or the like), a unique identifier assigned to the respective media presentation device within the media system 100, model and/or versioning information for the respective media presentation device (e.g., the type of electronic device, make and/or model of electronic device, firmware version, and the like). The media device 102 may also exchange network authentication information with a discovered device, such as, for example, secure sockets layer (SSL) keys, cryptographic keys, or the like. Thus, a STB that is newly deployed to a particular location may be automatically setup or otherwise configured to communicate with a television or other display device at that location via a WLAN by merely requiring the user to capture an image of a portion of the STB that includes identification information assigned to the STB.

It should be noted that the general systems, structures and techniques described above may be inter-combined, enhanced, modified and/or otherwise implemented to provide any number of different features. In particular, the term "exemplary" is used herein to represent one example, instance or illustration that may have any number of alternates. Any implementation described herein as "exemplary" should not necessarily be construed as preferred or advantageous over other implementations.

For the sake of brevity, conventional techniques related to networking, streaming, content distribution or delivery, communications standards or protocols, encoding/decoding standards or protocols, content formats, image and/or video processing, and other functional aspects of the systems (and the individual operating components of the systems) may not be described in detail herein. The subject matter may be described herein in terms of functional and/or logical block components, and with reference to symbolic representations of operations, processing tasks, and functions that may be performed by various computing components or devices. It should be appreciated that in alternative embodiments the various block components shown in the figures may be equivalently realized by any number of components configured to perform the specified functions. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus is not intended to be limiting. For example, terms such as "first," "second" and other such numerical terms referring to structures do not imply a sequence or order unless clearly indicated by the context.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents. Accordingly, details of the exemplary embodiments or other limitations described above should not be read into the claims absent a clear intention to the contrary.

What is claimed is:

1. A method of establishing communications with a media device, the method comprising:
   analyzing, by a media device management application executed by a processing system of a client device, an image including at least a portion of the media device to obtain device identification information associated with the media device;
   automatically determining, by the media device management application at the client device, network configuration information for communicating with the media device based at least in part on the device identification information derived from the image in accordance with logic integrated into the media device management application;
   automatically configuring, by the media device management application, a network interface of the client device to communicate on an ad-hoc wireless network associated with the media device using the network configuration information; and
   thereafter establishing, by the media device management application via the network interface, a peer-to-peer communication session with the media device via the ad-hoc wireless network, wherein the media device management application at the client device transmits authentication information over the ad-hoc wireless network to enable the peer-to-peer communication session based on the authentication information provided by the media device management application.

2. The method of claim 1, wherein the device identification information comprises an identifier assigned to a second network interface of the media device.

3. The method of claim 2, wherein analyzing the image comprises identifying the identifier assigned to the second network interface of the media device on a housing of the media device captured within the image.

4. The method of claim 3, wherein:
   identifying the identifier comprises reading a code provided on the housing of the media device; and
   the code comprises an encoded representation of a media access control (MAC) address.

5. The method of claim 4, wherein the code comprises a barcode or a quick response (QR) code.

6. The method of claim 1, further comprising requesting, by the media device management application at the client device, a listing of media programs available at the media device via the peer-to-peer communication session.

7. The method of claim 1, further comprising streaming, by the media device management application at the client device, media content received from the media device via the peer-to-peer communication session.

8. The method of claim 1, wherein the media device authenticates the client device for communication on the ad-hoc wireless network using the authentication information.

9. The method of claim 8, wherein:
   the device identification information comprises a media access control (MAC) address associated with a second network interface of the media device;
   the ad-hoc wireless network associated with the media device has and having a service set identifier (SSID) including a subset of the MAC address; and
   configuring the network interface comprises configuring the network interface to utilize the SSID including the subset of the MAC address to transmit the connection request including the authentication information.

10. The method of claim 1, further comprising automatically transmitting, by the client device to the media device via the peer-to-peer communication session, second network configuration information for a wireless local area network (WLAN) different from the ad-hoc wireless network, wherein the media device automatically establishes communications on the WLAN using the second network configuration information in response to receiving the second network configuration information.

11. The method of claim 1, further comprising identifying, by the media device management application, a device model of the media device, wherein automatically determining the network configuration information comprises automatically determining the network configuration information based at least in part on the device identification information and the device model.

12. The method of claim 11, wherein automatically determining the network configuration information comprises concatenating the device model and a portion of the device identification information.

13. The method of claim 1, wherein:
   the device identification information comprises a media access control (MAC) address assigned to the media device; and
   automatically determining the network configuration information comprises automatically determining a service set identifier (SSID) using a subset of the MAC address.

14. The method of claim 13, wherein the ad-hoc wireless network has the SSID broadcast by the media device and the SSID broadcast is hidden.

15. The method of claim 13, further comprising identifying, by the media device management application, a device model of the media device, wherein automatically determining the SSID comprises concatenating the device model and the subset of the MAC address.

16. The method of claim 1, further comprising:
   providing, by the media device management application, a first graphical user interface (GUI) display including an image region corresponding to a field of view of a camera of the media device to capture the image; and
   providing, by the media device management application, an updated GUI display that graphically indicates the network configuration information after automatically determining the network configuration information.

17. The method of claim 16, wherein the updated GUI display includes a selectable GUI element to initiate establishing the peer-to-peer communication session with the media device via the ad-hoc wireless network.

18. A computer-readable medium having computer-executable instructions stored thereon that, when executed by the processing system, cause the processing system to:
    analyze an image including at least a portion of a media device to obtain device identification information associated with the media device;
    automatically determine network configuration information for communicating with the media device based at least in part on the device identification information derived from the image;
    automatically configure a network interface of the client device to communicate on an ad-hoc wireless network associated with the media device using the network configuration information; and
    thereafter establish a peer-to-peer communication session with the media device via the ad-hoc wireless network by transmitting authentication information over the ad-hoc wireless network to enable the peer-to-peer communication session based on the authentication information.

19. The computer-readable medium of claim 18, wherein:
    the device identification information comprises a media access control (MAC) address assigned to a second network interface of the media device on a housing of the media device; and
    the network configuration information comprises a service set identifier (SSID) associated with the ad-hoc wireless network.

20. A client device comprising:
    an imaging arrangement to capture an image of a media device;
    a network interface; and
    a processing system coupled to the imaging arrangement and the network interface, wherein the processing system executes a media device management application configurable to analyze the image to obtain device identification information associated with the media device, automatically determine a service set identifier (SSID) associated with an ad-hoc wireless network associated with the media device using at least a portion of the device identification information, automatically switch the network interface to the determined SSID to communicate on the ad-hoc wireless network associated with the media device, and establish a peer-to-peer communications session with the media device via the ad-hoc wireless network by transmitting authentication information over the ad-hoc wireless network to enable the peer-to-peer communication session based on the authentication information provided by the media device management application, wherein the SSID associated with the ad-hoc wireless network includes the portion of the device identification information.

* * * * *